United States Patent Office 3,636,001
Patented Jan. 18, 1972

3,636,001
AMINE SALTS OF NITRAMINOTRIAZOLES
Fritz Reisser, Therwil, Switzerland, assignor to Sandoz Ltd. (also known as Sandoz AG), Basel, Switzerland
No Drawing. Continuation-in-part of abandoned application Ser. No. 814,461, Apr. 8, 1969. This application Nov. 12, 1969, Ser. No. 876,088
Claims priority, application Switzerland, Apr. 16, 1968, 5,563/68
Int. Cl. A01n 9/22; C07d 55/06
U.S. Cl. 260—308 R    24 Claims

ABSTRACT OF THE DISCLOSURE

Alkyl ammonium salts of 3-nitramino-1,2,4-triazoles useful as fungicides and acaricides.

---

This application is a continuation in part of application Ser. No. 814,461, filed Apr. 8, 1969, and now abandoned.

The present invention relates to new acaricidally or fungicidally active alkyl ammonium salts of 1,2,4-triazoles.

According to the invention we provide compounds of Formula I

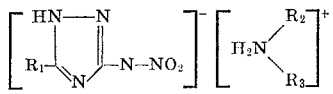

in which $R_1$ and $R_2$, which may be the same or different, each signify hydrogen or an alkyl radical containing 1 to 4 carbon atoms and $R_3$ signifies an alkyl radical containing from 10 to 16 carbon atoms, and preferably from 12 to 14 carbon atoms The compounds of the invention are shown in Formula I in a form in which the hydrogen atom is linked to the 1 nitrogen atom. The compounds of Formula I exist in a resonance form in which the hydrogen may be associated with any one of the three ring nitrogen atoms and the double bonds are associated with any two of the ring nitrogens.

Our invention also provides a process for the production of compounds of Formula I which comprises reacting a compound of Formula II,

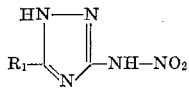

in which $R_1$ has the above significance, with an amine of Formula III,

in which $R_2$ and $R_3$ have the above significances.

The reaction is preferably effected at a temperature of from about 20° to about 150° C., preferably 40° to 130° C., optionally under pressure. The reaction is preferably effected in the presence of an organic solvent which is inert under the reaction conditions, for example, an alcohol, e.g. methanol, ethanol, isopropanol, or butanol; an ether, e.g. dioxane; an ether alcohol, e.g. β-ethoxyethanol; a hydrocarbon, e.g. benzene, toluene, or xylene; chlorobenzene; or a liquid amide, e.g. dimethyl formamide.

The compound of Formula III may be a primary or a secondary amine. Examples of amines of Formula III are decylamine, dodecylamine, tridecylamine, tetradecylamine, and hexadecylamine. The reaction time may range from 10 minutes to 3 hours depending on the solvent used.

When the reaction is complete the amine salts of Formula I may be isolated either by evaporation of the solvent to dryness, concentration of the solvent until crystallization occurs, precipitation with a suitable precipitating agent or, if the amine salts are sparingly soluble in the reaction medium, by direct filtration.

The compounds of Formulae II and III used as starting materials are known or may be produced in a manner analogous to that known for the production of the known compounds.

The compounds of Formula I have strong fungicidal properties and a good acaricidal effect. The compounds of Formula I, in which $R_3$ signifies an alkyl radical containing from 12 to 14 carbon atoms, have proved to be particularly effective. They are particularly suitable for combating spores of fungi e.g. of Alternaria and Stemphylium and especially phytopathogenic fungi. They are therefore useful as fungicides, for example, against known fungus dieases in plants, e.g. bean rust (Uromyces), barley mildew (Erysiphe) etc., as plant wound dressings and as seed disinfectants, as well as for the impregnation of wood, masonry etc. The compounds of Formula I are also useful as acaricides. The compounds of the invention have a low toxicity in warm-blooded animals and a low phytotoxicity.

The combating of fungi and acarides is carried out, for example by treatment of the objects to be protected with the active material.

The production of fungicidal and acaricidal compositions containing the active agents of Formula I may be effected e.g. by intimately mixing or grinding salts of Formula I with a suitable carrier, optionally with the addition of a dispersing agent or a solvent which is inert to the active agent.

In order to produce compositions which can be applied in solid form, e.g. dusting agents, granulates etc., the active agent may be mixed with a solid carrier, e.g. kaolin, talc, chalk, limestone, cellulose powder etc.

Substances improving adhesiveness and/or giving a better wettability and dispersibility may also be incorporated in the compositions.

Spraying powders and pastes for dispersion in water may be obtained by mixing or grinding the active agents with a dispersing agent and a powdery carrier until the mixture is homogeneous. The powdery carrier may be, for example, kaolin, talc, chalk, limestone, cellulose, powder etc. Commercial surface-active agents may be dispersing agents.

Dispersing agents, organic solvents and water may be used for the production of emulsion concentrates. Examples of suitable organic solvents include alcohols, benzene, xylene, toluene and dimethyl sulphoxide.

In order to produce solutions of the active agents one or more compounds of Formula I are dissolved in a suitable organic solvent, in a solvent mixture or water. Aliphatic and aromatic hydrocarbons which may optionally be chlorinated, or alkyl naphthalenes alone or in admixture with other organic solvents may be used as the organic solvent.

For special purposes the new alkyl ammonium salts of Formula I may be combined with other fungicides, e.g. with flowers of sulphur, Thiurams, or thiocarbamates. Compositions containing compounds of Formula I and suitable for application to a locus may contain, for example, between 0.01 and 80%, preferably between 2 and 50%, by weight of active agent, the concentration of the active depending on the method of application and on the effect required.

The fungicidal or acaricidal compositions can be applied as a spray or dust to the locus to be protected from the fungi or acarids, e.g. to growing crops, trees or bushes. Such application can be made directly to the locus during the period of fungus or acarid infestation, or alternatively the application can be made in advance of an anticipated fungus or acarid infestation to prevent such infestation. For example the compositions can be applied as foliar sprays or dusts.

The invention is illustrated, but in no way limited by reference to the following examples in which all temperatures are in ° C. and the parts are by weight.

EXAMPLE 1 n-Tetradecyl ammonium salt of 2-nitramino-1,2,4-triazole 86 g. of 3-nitramino-1,2,4-triazole and 142 g. of n-tetradecylamine are stirred in 1500 cc. of dimethyl formamide at 80° for 2 hours. Subsequent the mixture is allowed to cool on standing whereby the colourless n-tetradecyl ammonium salt of 3-nitramino-1,2,4-triazole crystallizes. The compound obtained in this manner is analytically pure and has a melting point of 158–160° C.

Calcd. for $C_{16}H_{34}N_6O_2$ (molecular weight, 342.5) (percent): C, 56.1; H, 10.0; O, 9.4. Found (percent): C, 56.4; H, 10.2; O, 9.4.

The following compounds of Formula I shown in Table 1 are obtained in a manner analogous to that described in the previous paragraph.

The 3-nitramino-1,2,4-triazoles used as starting materials were produced in manner known per se by nitrating the corresponding 3-amino-1,2,4-triazoles in a mixture of concentrated suphuric acid and fuming nitric acid at 0°.

EXAMPLE a

Spore germination test—*Stemphylium sarciniforme*

In order to produce an active agent formulation, 25 parts of the n-dodecyl ammonium salt of 3-nitramino-1,2,4-triazole are worked up with 3 parts of isooctylphenyldecaglycol ether, 7 parts of silica gel and 65 parts of kaolin, in a ball mill to give an active agent concentrate capable of being suspended in water.

The concentrate is diluted with water to the desired concentration and is tested as a spraying agent with different active agent concentrations as follows:

For every concentration a slide placed on a turn-table is provided with a coating of spraying liquor by two passages under a fixed spray nozzle. The amount of liquor put on each slide of 19.5 cm.[2] is from about 0.03 to 0.14 cc. After a drying period of 4 hours, 3 drops of a suspension of spores (conidia) of *Stemphylium sarciniforme* are placed on each slide by means of a pipette (density about 200,000 spores per cc.). Subsequently the slides are placed on wet filter paper in Petri dishes, covered and kept in a thermostat at 23° for 24 hours. The evaluation of spore germination is effected under the microscope after 24 hours.

The results of the evaluation are shown in Table 2.

EXAMPLE 2

Spore germination test—*Alternaria circinans*

In order to produce an active agent formulation 5 parts of the n-tetradecyl ammonium salt of 3-nitramino-1,2,4-triazole are stirred with 30 parts of dimethyl sulphoxide and 5 parts of isooctylphenyldecaglycol ether as emulsifying agent, whereby a clear solution results. The solution may be diluted to the desired concentration with water and may be used as spraying agent.

The spore germination test is effected and evaluated using the method indicated in Example a (*Stemphylium sarciniforme*). The spore suspension contains about 100,000 conidia per cc.

The results of the spore germination test according to Examples a and b are given in Table 2. The following evaluation scale was used:

0=no effect=90–100% of spores germinated
3=weak effect=50–90% of spores germinated
6=medium to good effect=10–50% of spores germinated
9=very good effect=0–10% of spores germinated.

TABLE 2

| | Compound | | | |
|---|---|---|---|---|
| | *Stemphylium sarciniforme* | | *Alternaria circinans* | |
| Percent of active agent | 0.2 | 0.05 | 0.2 | 0.05 |
| Example No.: | | | | |
| 1 | 9 | 9 | 9 | 9 |
| 2 | 9 | 9 | 9 | 9 |
| 6 | 9 | 9 | 9 | 9 |
| 7 | 9 | 9 | 9 | 9 |
| 9 | 9 | 9 | 9 | 9 |
| 10 | 9 | 9 | 9 | 9 |
| 12 | 9 | 9 | 9 | 9 |
| 13 | 9 | 9 | 9 | 9 |
| 14 | 9 | 9 | 9 | 9 |
| 15 | 9 | 9 | 9 | 9 |
| 16 | 9 | 9 | 9 | 9 |
| 17 | 9 | 9 | 9 | 9 |
| 18 | 6 | 6 | 9 | 9 |
| 19 | 9 | 9 | 9 | 9 |

TABLE 1

| Example No. | R₁ | R₂ | R₃ | Formula | Mol-wt. | M.P. (° C.) | Calculated C | Calculated H | Calculated N | Found C | Found H | Found N |
|---|---|---|---|---|---|---|---|---|---|---|---|---|
| 2 | H | H | n-C₁₂H₂₅ | C₁₄H₃₀N₆O₂ | 314.4 | 159–162 | 53.6 | 9.6 | 26.7 | 54.0 | 9.7 | 26.9 |
| 3 | H | H | n-C₁₆H₃₃ | C₁₈H₃₈N₆O₂ | 370.5 | 132–133 | 58.3 | 10.3 | 22.7 | 58.5 | 10.5 | 21.6 |
| 4 | H | CH₃ | n-C₁₂H₂₅ | C₁₅H₃₂N₆O₂ | 328.4 | 71–74 | 54.8 | 9.8 | 25.6 | 55.0 | 9.9 | 25.3 |
| 5 | H | n-C₄H₉ | n-C₁₂H₂₅ | C₁₈H₃₈N₆O₂ | 370.5 | 81–85 | 58.3 | 10.3 | 22.7 | 58.4 | 10.5 | 22.4 |
| 6 | CH₃ | H | n-C₁₂H₂₅ | C₁₅H₃₂N₆O₂ | 328.4 | 161–164 | 54.8 | 9.8 | 25.6 | 54.8 | 10.0 | 25.8 |
| 7 | CH₃ | H | n-C₁₄H₂₉ | C₁₇H₃₆N₆O₂ | 356.5 | 158–161 | 57.2 | 10.2 | 23.6 | 57.2 | 10.4 | 24.4 |
| 8 | C₂H₅ | H | n-C₁₀H₂₁ | C₁₄H₃₀N₆O₂ | 314.4 | 140–142 | 53.6 | 9.6 | 26.7 | 53.8 | 9.7 | 26.6 |
| 9 | C₂H₅ | H | n-C₁₂H₂₅ | C₁₆H₃₄N₆O₂ | 342.5 | 141–143 | 56.1 | 10.0 | 24.5 | 55.7 | 9.5 | 24.9 |
| 10 | C₂H₅ | H | n-C₁₄H₂₉ | C₁₈H₃₈N₆O₂ | 370.5 | 128–131 | 58.3 | 10.3 | 22.7 | 58.5 | 10.2 | 22.9 |
| 11 | C₂H₅ | H | n-C₁₆H₃₃ | C₂₀H₄₂N₆O₂ | 398.6 | 141–143 | 60.3 | 10.6 | 21.0 | 60.3 | 10.9 | 20.8 |
| 12 | C₂H₅ | CH₃ | n-C₁₂H₂₅ | C₁₇H₃₆N₆O₂ | 356.5 | 64–66 | 57.6 | 10.2 | 23.6 | 57.0 | 10.4 | 23.5 |
| 13 | C₂H₅ | C₂H₅ | n-C₁₂H₂₅ | C₁₈H₃₈N₆O₂ | 370.5 | 47–51 | 58.3 | 10.3 | 22.7 | 58.0 | 9.9 | 22.7 |
| 14 | C₂H₅ | n-C₃H₇ | n-C₁₂H₂₅ | C₁₉H₄₀N₆O₂ | 384.5 | 60–62 | 59.3 | 10.5 | 21.8 | 59.5 | 10.6 | 21.7 |
| 15 | C₂H₅ | n-C₄H₉ | n-C₁₂H₂₅ | C₂₀H₄₂N₆O₂ | 398.6 | 50–52 | 60.3 | 10.6 | 21.0 | 59.9 | 10.5 | 21.3 |
| 16 | C₂H₅ | CH₃ | n-C₁₃H₂₇ | C₁₈H₃₈N₆O₂ | 370.5 | Oil | 58.3 | 10.3 | 22.7 | 58.4 | 10.3 | 22.9 |
| 17 | C₂H₅ | CH₃ | n-C₁₄H₂₉ | C₁₉H₄₀N₆O₂ | 384.5 | 73–75 | 59.3 | 10.5 | 21.8 | 59.2 | 10.4 | 21.9 |
| 18 | C₂H₅ | n-C₃H₇ | n-C₁₄H₂₉ | C₂₁H₄₄N₆O₂ | 412.6 | Oil | 61.1 | 10.8 | 20.4 | 61.4 | 11.0 | 20.3 |
| 19 | C₂H₅ | n-C₄H₉ | n-C₁₄H₂₉ | C₂₂H₄₆N₆O₂ | 426.6 | Oil | 61.9 | 10.9 | 19.7 | 62.1 | 11.0 | 19.6 |
| 20 | C₂H₅ | CH₃ | n-C₁₆H₃₃ | C₂₁H₄₄N₆O₂ | 412.6 | 66–69 | 61.1 | 10.8 | 20.4 | 61.1 | 10.7 | 20.5 |
| 21 | C₂H₅ | C₂H₅ | n-C₁₆H₃₃ | C₂₂H₄₆N₆O₂ | 426.6 | 50–52 | 61.9 | 10.9 | 19.7 | 62.0 | 10.8 | 19.9 |
| 22 | C₂H₅ | n-C₃H₇ | n-C₁₆H₃₃ | C₂₃H₄₈N₆O₂ | 440.6 | 58–61 | 62.7 | 11.0 | 19.1 | 62.9 | 11.2 | 19.0 |

EXAMPLE c

Contact effect in beans

Potted bean plants (*Phaseolus vulgaris*) with 2 primary leaves, are watered with 70 cc. of a suspension, produced as in Example b, of an active agent of Formula I in such a manner that the green parts of the plants remain untouched by the solution. After 24 hours the plants are infected with spores of bean rust (*Uromyces phaseoli*). Thereafter they are kept at a relative humidity of 100% for 2 days and then under normal laboratory conditions and under artificial light for a further 10 days, after which time the degree of infection is evaluated. The results are given in Table 3, the following evaluation scale being used:

0 = no effect = all leaves strongly infected
3 = weak effect = more than half of the leaves infected
6 = medium to good effect = less than half of the leaves moderately infected
9 = very good effect = only very weak infection of some leaves.

The intermediate values given refer to further graduation between the figures on the evaluation scale.

TABLE 3

| | Compound—*Uromyces phaseoli* | | |
|---|---|---|---|
| Percent of active agent | 0.2 | 0.05 | 0.0125 |
| Example No.: | | | |
| 2 | 9 | 9 | 6 |
| 9 | 9 | 7 | 6 |
| 10 | 9 | 8 | 6 |
| 14 | | 9 | 6 |
| 15 | | 9 | 7 |

Example d

Wound dressing paste

A paste made from 3 parts of a compound of Formula I in which $R_1$ and $R_2$ signify hydrogen and $R_3$ signifies the tetradecyl group, and 41 parts of a polymerized acrylate emulsion, 0.6 part of the sodium salt of a polymeric carboxylic acid (known in commerce as Tamol 731), 0.2 part of octylphenol-polyglycol ether, 2 parts of ethylene glycol, 0.2 part of hydroxyethyl cellulose, 20 parts of titanium dioxide, 9 parts of calcium carbonate, 8 parts of talcum, 0.2 part of ammona and 15.8 parts of water, when applied on tree wounds, forms an elastic and weatherproof wound closure.

What is claimed is:

1. Compounds of formula

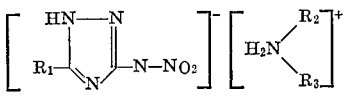

in which $R_1$ and $R_2$, which may be the same or different, each hydrogen or an alkyl radical containing 1 to 4 carbon atoms and
$R_3$ signifies an alkyl radical containing from 10 to 16 carbon atoms.

2. A compound according to claim 1 wherein $R_3$ signifies an alkyl radical containing from 12 to 14 carbon atoms.

3. A compound according to claim 1 which is the n-tetradecyl ammonium salt of 3-nitramino-1,2,4-triazole.

4. A compound according to claim 1 which is the n-dodecyl ammonium salt of 3-nitramino-1,2,4-triazole.

5. A compound according to claim 1 which is the n-hexadecyl ammonium salt of 3-nitramino-1,2,4-triazole.

6. A compound according to claim 1 which is the methyl n-dodecyl ammonium salt of 3-nitramino-1,2,4-triazole.

7. A compound according to claim 1 which is the n-dodecyl n-butyl ammonium salt of 3-nitramino-1,2,4-triazole.

8. A compound according to claim 1 which is the n-dodecyl ammonium salt of 3-nitramino-5-methyl-1,2,4-triazole.

9. A compound according to claim 1 which is the n-tetradecyl ammonium salt of 3-nitramino-5-methyl-1,2,4-triazole.

10. A compound according to claim 1 which is the n-decyl ammonium salt of 3-nitramino-5-ethyl-1,2,4-triazole.

11. A compound according to claim 1 which is the n-dodecyl ammonium salt of 3-nitramino-5-ethyl-1,2,4-triazole.

12. A compound according to claim 1 which is the n-tetradecyl ammonium salt of 3-nitramino-5-ethyl-1,2,4-triazole.

13. A compound according to claim 1 which is the n-hexadecyl ammonium salt of 3-nitramino-5-ethyl-1,2,4-triazole.

14. A compound according to claim 1 which is the n-dodecyl methyl ammonium salt of 3-nitramino-5-ethyl-1,2,4-triazole.

15. A compound according to claim 1 which is the n-dodecyl ethyl ammonium salt of 3-nitramino-5-ethyl-1,2,4-triazole.

16. A compound according to claim 1 which is the n-dodecyl n-propyl ammonium salt of 3-nitramino-5-ethyl-1,2,4-triazole.

17. A compound according to claim 1 which is the n-dodecyl n-butyl ammonium salt of 3-nitramino-5-ethyl-1,2,4-triazole.

18. A compound according to claim 1 which is the n-tridecyl methyl ammonium salt of 3-nitramino-5-ethyl-1,2,4-triazole.

19. A compound according to claim 1 which is the n-tetradecyl methyl ammonium salt of 3-nitramino-5-ethyl-1,2,4-triazole.

20. A compound according to claim 1 which is the n-tetradecyl n-propyl ammonium salt of 3-nitramino-5-ethyl-1,2,4-triazole.

21. A compound according to claim 1 which is the n-tetradecyl n-butyl ammonium salt of 3-nitramino-5-ethyl-1,2,4-triazole.

22. A compound according to claim 1 which is the n-hexadecyl methyl ammonium salt of 3-nitramino-5-ethyl-1,2,4-triazole.

23. A compound according to claim 1 which is the n-hexadecyl ethyl ammonium salt of 3-nitramino-5-ethyl-1,2,4-triazole.

24. A compound according to claim 1 which is the n-hexadecyl n-propyl ammonium salt of 3-nitramino-5-ethyl-1,2,4-triazole.

References Cited

FOREIGN PATENTS 484,920  3/1970  Switzerland _____ 260—308

ALTON D. ROLLINS, Primary Examiner

U.S. Cl. X.R.

106—15 R; 424—269